US012331457B1

(12) United States Patent
Moon

(10) Patent No.: US 12,331,457 B1
(45) Date of Patent: Jun. 17, 2025

(54) DIRECT TO FILM (DTF) TRANSFER ADHESIVE APPLICATION UNIT WITH A VERTICAL CURING AREA

(71) Applicant: Dennis Moon, Sanger, TX (US)

(72) Inventor: Dennis Moon, Sanger, TX (US)

( * ) Notice: Subject to any disclaimer, the term of this patent is extended or adjusted under 35 U.S.C. 154(b) by 106 days.

(21) Appl. No.: 18/367,353

(22) Filed: Sep. 12, 2023

Related U.S. Application Data

(60) Provisional application No. 63/440,762, filed on Jan. 24, 2023.

(51) Int. Cl.

| | |
|---|---|
| ***D06P 5/24*** | (2006.01) |
| ***B05C 19/00*** | (2006.01) |
| ***B05C 19/06*** | (2006.01) |
| ***D06P 5/02*** | (2006.01) |

(52) U.S. Cl.
CPC ............ *D06P 5/003* (2013.01); *B05C 19/008* (2013.01); *B05C 19/06* (2013.01); *D06P 5/02* (2013.01)

(58) Field of Classification Search
CPC . D06P 5/003; D06P 5/02; B05C 9/008; B05C 9/16
See application file for complete search history.

(56) References Cited

U.S. PATENT DOCUMENTS

| | | | |
|---|---|---|---|
| 8,292,395 | B2 | 10/2012 | Ben-Zur |
| 11,230,118 | B2 | 1/2022 | Friedrich |

FOREIGN PATENT DOCUMENTS

| | | | |
|---|---|---|---|
| JP | 5173833 | B2 | 4/2013 |

*Primary Examiner* — Sonya M Sengupta
(74) *Attorney, Agent, or Firm* — Richard Eldredge; Leavitt Eldredge Law Firm

(57) ABSTRACT

A direct to film (DTF) transfer adhesive application unit with a vertical curing area overcomes space constraints associated with conventional DTF systems having a horizontal curing area.

3 Claims, 3 Drawing Sheets

DIRECT TO FILM (DTF) TRANSFER ADHESIVE APPLICATION UNIT WITH A VERTICAL CURING AREA

BACKGROUND

1. Field of the Invention

The present invention relates generally to garment printing systems, and more specifically to a direct to film (DTF) transfer garment printing system with a vertical curing area.

2. Description of Related Art

Direct to film (DTF) transfer adhesive application and curing systems are well known in the art and are effective means to apply custom designs to garments. In the DTF transfer process, a design is digitally printed onto an ink-receptive film, the printed film is coated, or "dusted" with an adhesive powder, and the powdered film is heated. This cures the adhesive powder, preparing the film to be applied to a garment through heat pressing, which transfers the design seamlessly to the garment with high quality results.

One of the problems commonly associated with existing system is that they are large and take up a substantial amount of horizontal space, and thus a user may have difficulty fitting them through doorways. Accordingly, although great strides have been made in the area of garment printing systems, many shortcomings remain. It is therefore an objective of the present invention to provide a DTF transfer unit with a vertically oriented curing area in order to reduce the space occupied by the unit.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
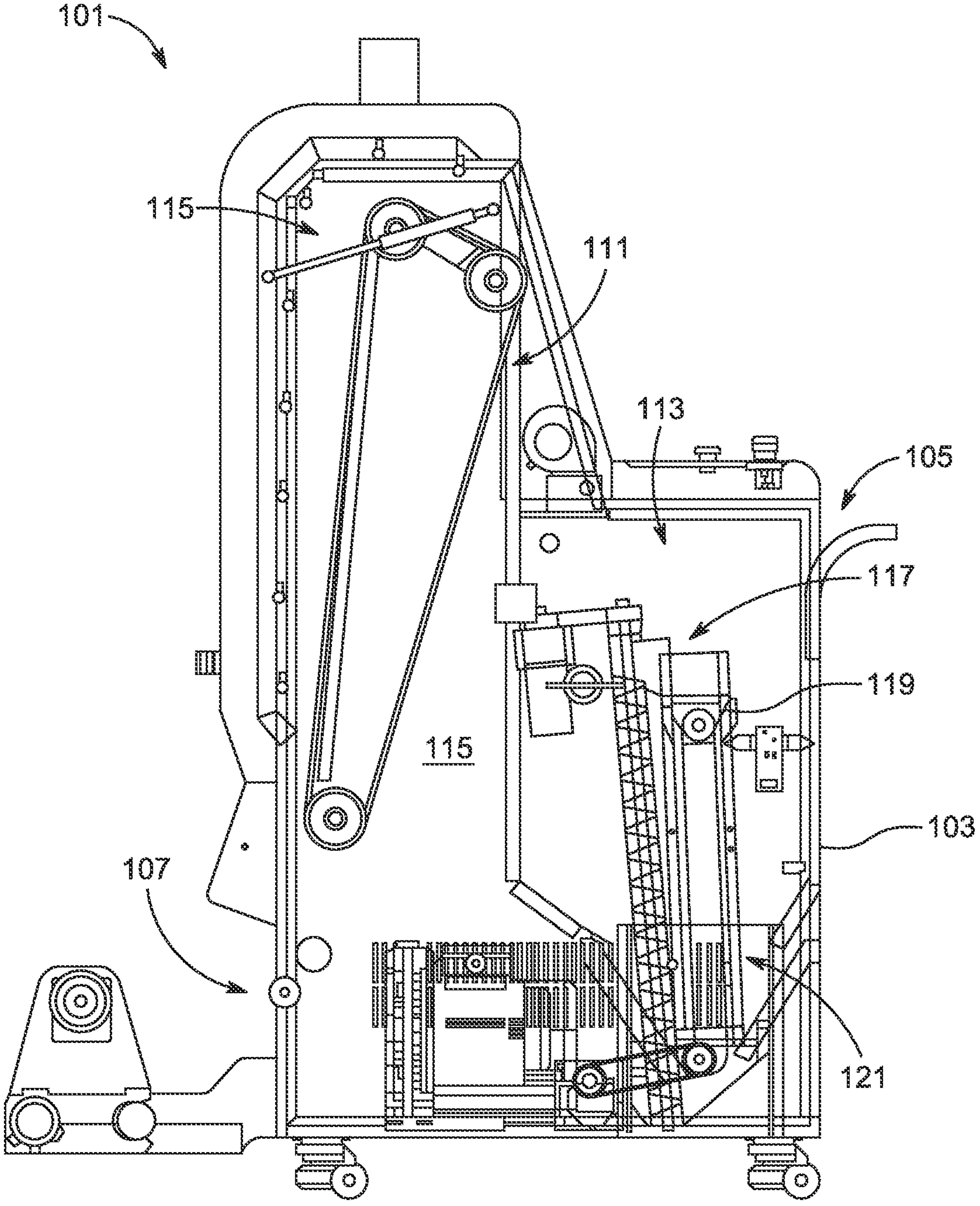
FIG. 1 is a side cross-sectional view of a preferred embodiment of the DTF transfer unit with a vertically oriented curing area of the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional DTF transfer adhesive application units, or "dusters." Specifically, the system of the present invention has a vertically oriented curing area, reducing the horizontal footprint of the unit. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
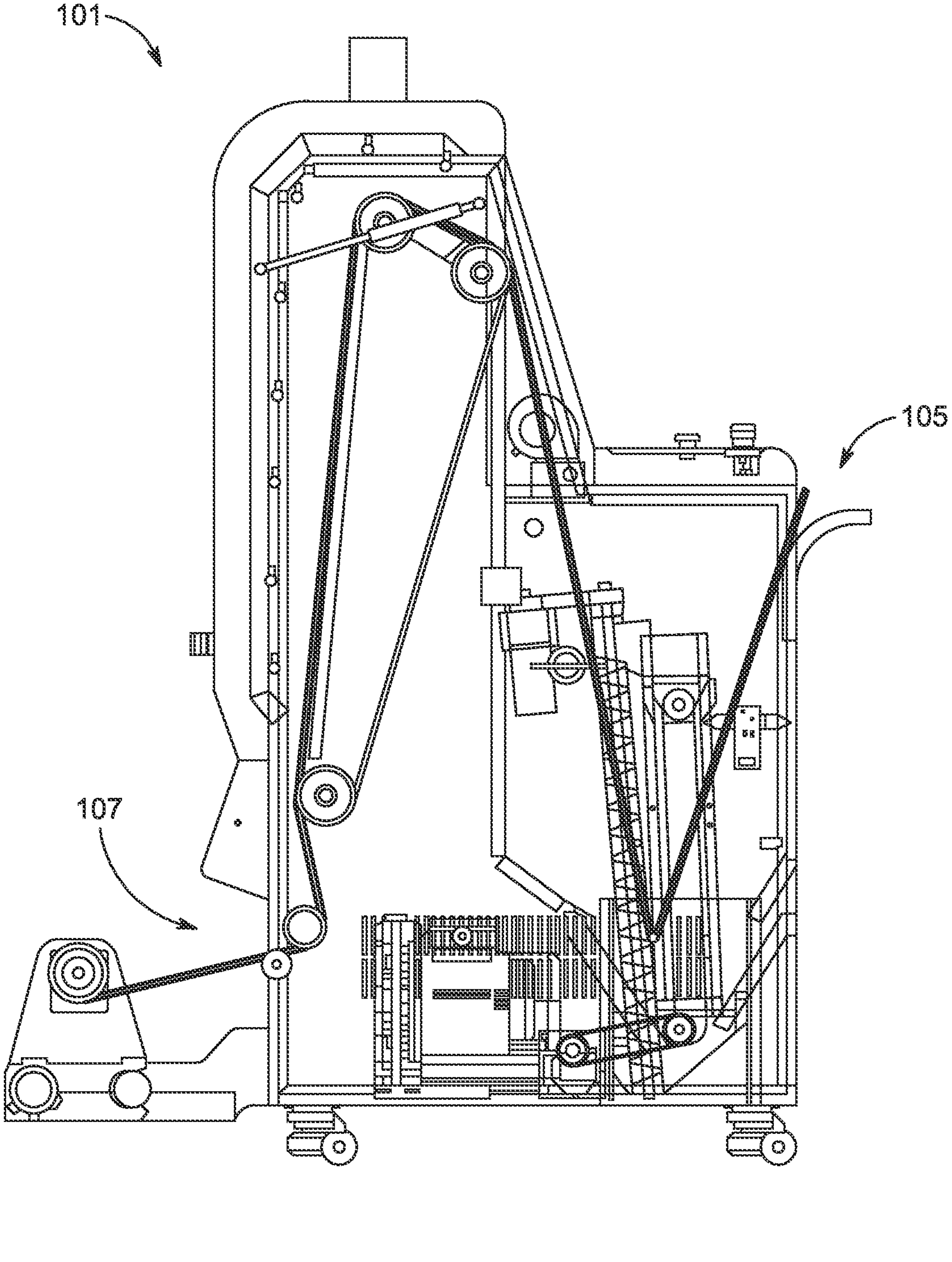
FIG. 2 is variation of FIG. 2 showing the path of a printed film from an ingress to an egress of the housing of the present invention.
Figure 3:
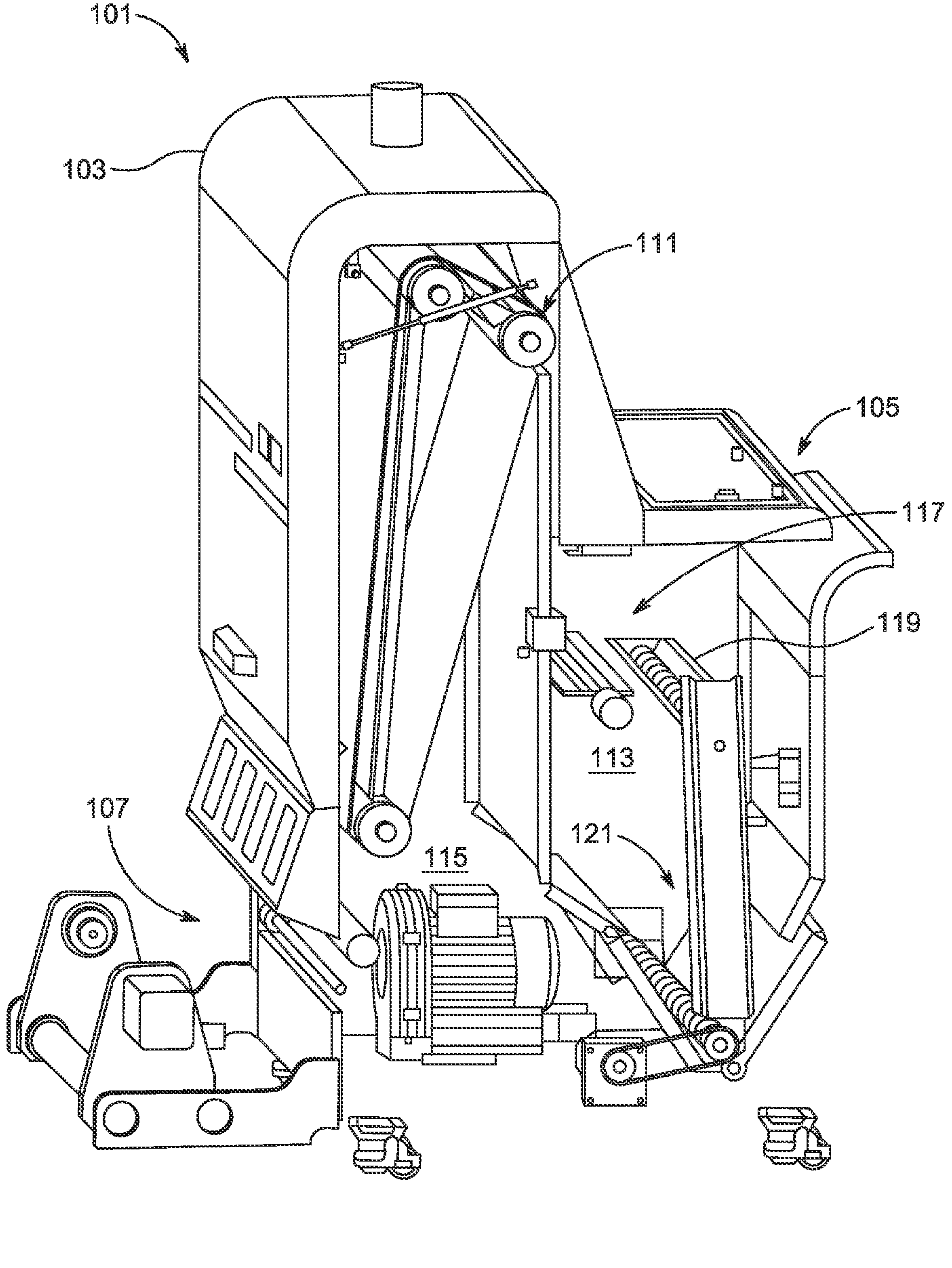
FIG. 3 is a perspective cutaway illustration of the present invention.

Referring now to the drawings wherein like reference characters identify corresponding or similar elements throughout the several views, FIGS. 1-3 depict views of a DTF transfer adhesive application unit 101, or "DTF duster," with a vertical curing area in accordance with a preferred embodiment of the present application. It will be appreciated that the DTF duster 101 of the present application overcomes one or more of the above-listed problems commonly associated with conventional DTF dusters. In addition, it should be appreciated that more or fewer of such components may be included in different embodiments of the present invention.

In the contemplated embodiment, DTF duster unit 101 includes a housing 103 configured to contain and support all the relevant and necessary components of the unit. The housing 103 has an ingress 105 and an egress 107 for a printed film 109 to be transferred through via a conveyor system 111 through the housing 103 for processing. A user inserts one end of the printed film 109 into the ingress 105, where it is taken hold of by a conveyor system 111, which transports the printed film 109 sequentially from the ingress 105, through a dusting chamber 113, through a vertical curing chamber 115, and out of the housing 103 through the egress 107.

Adjacent to the ingress 105, within the housing 103, is the dusting chamber 113. As the conveyor system 111 displaces the film through the dusting chamber 113, a dusting system 117 applies adhesive powder to the film. It should be noted that the words "dust" and "powder" and variations thereof may be used interchangeably herein to refer to a granulated adhesive substance known in the art to be used in the described process.

The dusting system 117 may be of any suitable configuration to suit this purpose, such as existing dusting systems. More particularly, the dusting system 117 may incorporate a dust trough 119, a container to hold the adhesive dust, and a rotating shaft with bristles or a similar mechanism positioned at the bottom of the trough. As the printed film 109 passes by the trough, the rotating shaft agitates the adhesive dust, displacing it and distributing it evenly onto the surface of the film, where the dust sticks to the ink printed onto the film. Excess powder is then removed via a shaking mechanism which rapidly agitates the film to shake loose any adhesive dust that did not sufficiently stick to the ink of the printed design. Thus, the adhesive dust is left only in regions of the film corresponding to the printed design, ready for the curing process.

After the dusting chamber 113, the conveyor system 111 transports the printed film 109 into a vertical curing chamber 115. It should be appreciated that the curing chamber being oriented vertically is one of the unique features believed characteristic of the present invention. The vertical curing chamber 115 is equipped with heating elements and proper insulation in order to achieve even and consistent heat distribution therein for optimal curing of the adhesive dust applied to the printed film 109. The vertical curing chamber 115 is configured to be tall enough so that the adhesive dust has enough time to cure as the conveyor system 111 pulls the printed film 109 through the vertical curing chamber 115.

It is also contemplated and will be appreciated that the present invention can also incorporate a powder recycle system 121 to minimize waste and improve efficiency. The recycle system 121 captures excess adhesive powder removed from the film during the dusting process and returns it to the powder trough for reuse. The system may also include a delay feature that prevents the powder from escaping, ensuring clean and efficient operation.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A direct to film (DTF) transfer adhesive application unit with a vertical curing area comprising:

a housing having an ingress and an egress for a printed film;

a conveyor system configured to convey the printed film from the ingress to the egress;

a dusting chamber positioned within the housing adjacent to the ingress, wherein the dusting chamber comprises a dusting system for applying adhesive powder to the printed film as the conveyor system conveys the printed film through the dusting chamber;

a vertical curing chamber positioned within the housing between the dusting chamber and the egress, wherein the conveyor system is configured to convey the printed film sequentially from the ingress, through the dusting chamber, through the vertical curing chamber, and out of the housing through the egress.

2. The DTF transfer adhesive application unit with a vertical curing area of claim 1, wherein the vertical curing chamber is configured to provide sufficient time for curing adhesive powder applied to the printed film as the conveyor system pulls the printed film through the vertical curing chamber.

3. The DTF transfer adhesive application unit with a vertical curing area of claim 1, further comprising a powder recycle system configured to capture excess adhesive powder removed from the printed film during the dusting process and return the excess adhesive powder to a dust trough of the dusting system for reuse.

* * * * *